(12) United States Patent
Ryan, III et al.

(10) Patent No.: US 7,264,273 B2
(45) Date of Patent: Sep. 4, 2007

(54) BALLAST SYSTEM FOR USE IN A CARGO BED OF A VEHICLE

(76) Inventors: James Joseph Ryan, III, 78 Call Rd., Colrain, MA (US) 01340; Jennifer Anne Ryan, 78 Call Rd., Colrain, MA (US) 01340

( * ) Notice: Subject to any disclaimer, the term of this patent is extended or adjusted under 35 U.S.C. 154(b) by 389 days.

(21) Appl. No.: 10/827,585

(22) Filed: Apr. 19, 2004

(65) Prior Publication Data

US 2004/0227338 A1 Nov. 18, 2004

Related U.S. Application Data

(60) Provisional application No. 60/463,495, filed on Apr. 17, 2003, provisional application No. 60/465,334, filed on Apr. 25, 2003.

(51) Int. Cl.
*B60S 9/00* (2006.01)

(52) U.S. Cl. ............................ 280/759; 296/39.2

(58) Field of Classification Search ........... 280/759, 280/755, 757; 296/39.1, 39.2
See application file for complete search history.

(56) References Cited

U.S. PATENT DOCUMENTS

| | | | | |
|---|---|---|---|---|
| 3,992,835 A | * | 11/1976 | Saveker | 52/220.2 |
| 4,190,281 A | | 2/1980 | Chandler | 296/37.6 |
| 4,339,142 A | | 7/1982 | Tanner et al. | 280/759 |
| 4,482,169 A | | 11/1984 | Yim | 280/759 |
| 4,572,700 A | * | 2/1986 | Mantarro et al. | 404/35 |
| 4,796,914 A | | 1/1989 | Raynor | 280/757 |
| 4,802,705 A | * | 2/1989 | Elwell | 296/39.2 |
| D302,416 S | * | 7/1989 | Lehner et al. | D12/203 |
| 4,902,038 A | | 2/1990 | Grover | 280/757 |
| 4,971,356 A | | 11/1990 | Cook | 280/759 |
| 5,080,418 A | * | 1/1992 | Semple et al. | 296/39.2 |
| 5,330,227 A | | 7/1994 | Anderson | 280/759 |
| 5,664,825 A | * | 9/1997 | Henke et al. | 296/136.02 |
| 5,695,235 A | * | 12/1997 | Martindale et al. | 296/39.2 |
| 5,899,287 A | * | 5/1999 | Kadlubski | 180/68.6 |
| 5,965,238 A | * | 10/1999 | Saitoh et al. | 428/178 |
| 6,061,980 A | * | 5/2000 | Poiencot | 52/177 |
| 6,237,980 B1 | * | 5/2001 | Miles et al. | 296/39.2 |
| 6,283,527 B1 | | 9/2001 | Desmarais | 296/39.2 |
| 6,431,629 B1 | * | 8/2002 | Emery | 296/39.2 |
| 6,578,896 B1 | * | 6/2003 | Peterson | 296/97.23 |
| 6,586,083 B1 | * | 7/2003 | Weiss et al. | 428/297.1 |
| 2002/0101069 A1 | * | 8/2002 | Dombey | 280/759 |
| 2002/0149223 A1 | * | 10/2002 | Saucier et al. | 296/39.2 |

* cited by examiner

*Primary Examiner*—Paul N. Dickson
*Assistant Examiner*—Leonard McCreary, Jr.
(74) *Attorney, Agent, or Firm*—Bourque and Associates (57) ABSTRACT

A ballast system for use in a cargo bed of a vehicle, such as a pick-up truck, provides generally even weight distribution over rear or powered wheels of the vehicle. The ballast system provides additional weight to the cargo bed of the vehicle, thereby improving stability, handling, and rear wheel traction, especially during inclement weather, such as in snow or rain. The ballast system may be rolled-up into a compact roll during non-use for convenient storage. The ballast system has a plurality of weighted cross-members laminated, attached, or bonded between two generally pliable mats. The cross-members are, preferably, equally spaced apart from each other along widths of the mats and transverse to a longitudinal direction of the cargo bed of the vehicle. The ballast system is readily rolled-up into a compact roll for convenient storage.

20 Claims, 7 Drawing Sheets

BALLAST SYSTEM FOR USE IN A CARGO BED OF A VEHICLE

CROSS-REFERENCE TO RELATED APPLICATIONS

This application claims priority from U.S. Provisional Patent Application No. 60/463,495, entitled "Provisional Patent Application for Weighted Mats Designed to be Placed in the Bed of a Pick-up Truck to Increase Rear Tire Traction," which was filed on Apr. 17, 2003, and U.S. Provisional Patent Application No. 60/465,334, entitled "Provisional Patent Application for Weighted Mats Designed to be Placed in the Bed of a Pick-up Truck to Increase Rear Tire Traction," which was filed on Apr. 25, 2003.

TECHNICAL FIELD OF THE INVENTION

The present invention relates to vehicles having cargo areas and more particularly, to ballast systems for cargo areas or beds of vehicles.

DESCRIPTION OF THE RELATED ART

Vehicles designed for carrying cargo, such as pick-up trucks, are engineered for optimum handling when loaded to capacity or weighted down with cargo. Unfortunately, however, traction and handling problems can occur as a result of insufficient weight over the vehicle's power-driven wheels. Significantly, traction and handling problems are magnified in adverse conditions, such as in rain or snow. Many owners of these vehicles have attempted to overcome these problems by placing sandbags, buckets of sand, bricks, cinder blocks, and the like in the cargo area or bed to weight down the vehicle. The problem with placing these items in the cargo area of the vehicle is that they occupy space that could be used to transport cargo. Further, these items tend to become displaced during the normal operation of the vehicle. If these items are displaced, they may cause damage to the vehicle. Moreover, in the event of an accident or sudden stop, these items may become airborne and cause serious injury or death to the occupants of the vehicle.

One type of device in the prior art that attempts to overcome these problems utilizes container means placed on the floor of the cargo area or bed to add weight to the vehicle. Another device in the prior art utilizes hollow, sectional containers loaded or filled with materials to provide additional weight to the cargo bed of the vehicle. The problems with these devices are that they are big and bulky and are not readily removable from the cargo area or bed. Further, a mat or bed liner may be necessary to increase friction on the top surface of these devices.

Another type of device in the prior art utilizes inner tube traction devices that are placed in various areas of the cargo area or bed. The problems with these inner tube traction devices are that they can also become airborne or displaced, causing injury or death to the occupants of the vehicle or damage to vehicle.

Accordingly, what is needed is a ballast system for use in a cargo area or bed of a vehicle, such as a pick-up truck, to provide additional weight and stability to the cargo area or bed, thereby improving traction and handling of the vehicle.

SUMMARY OF THE INVENTION

The present invention is a ballast system for use in a cargo bed of a vehicle, such as a pick-up truck. The ballast system provides even weight distribution over rear or powered wheels of the vehicle. The ballast system provides additional weight to the cargo bed of the vehicle, thereby improving stability, handling, and rear wheel traction, especially during inclement weather, such as in snow or rain. When deployed, the ballast system does not prevent use and/or access to the cargo area of the vehicle as most objects may be place on top of the ballast system.

In the preferred embodiment, the ballast system has cross-members laminated, attached, or bonded between two mats. The cross-members are, preferably, equally spaced apart from each other along widths of the mats and transverse to a longitudinal direction of the cargo bed of the vehicle. The ballast system is readily rolled-up into a compact roll for convenient storage.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
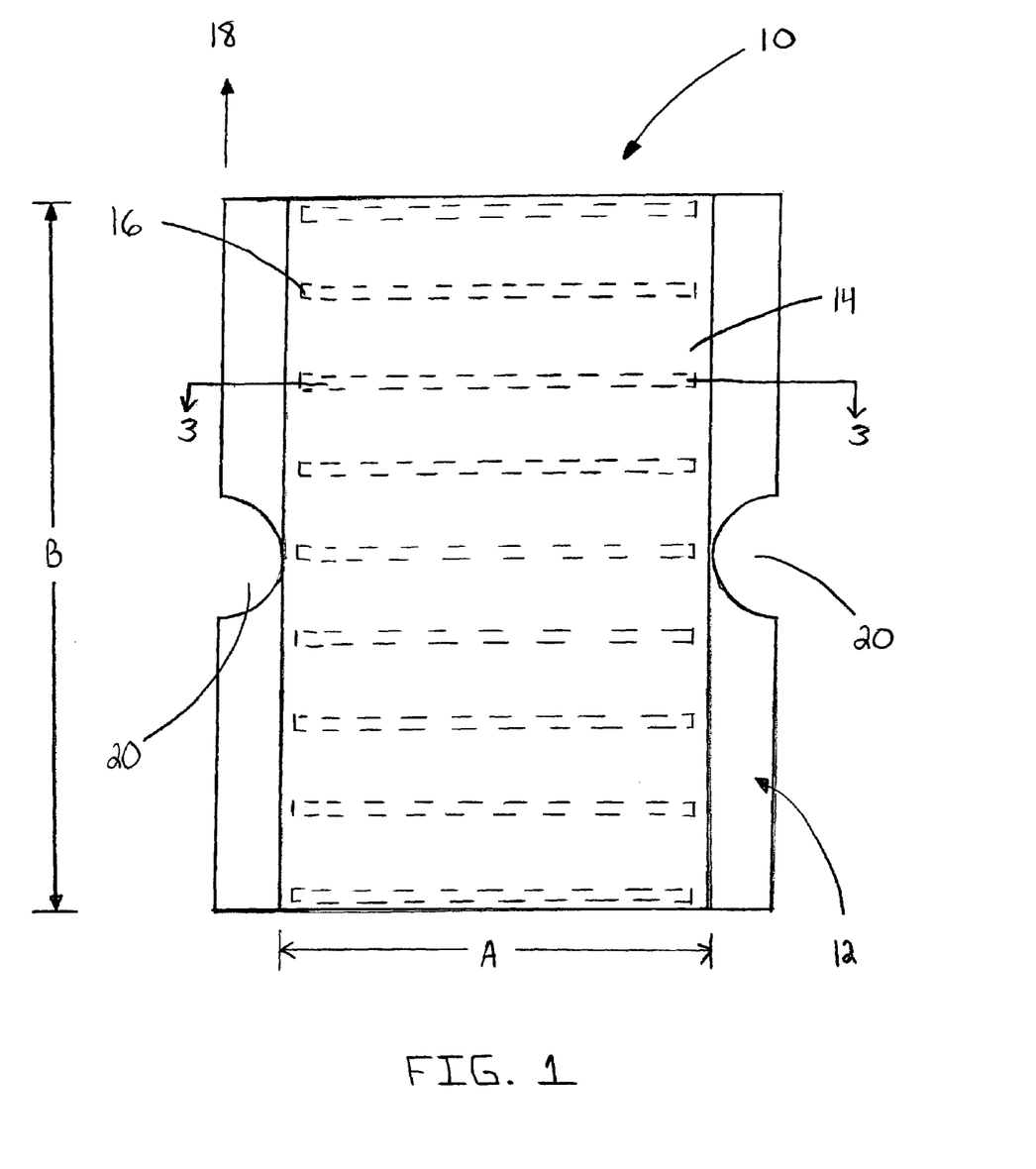
FIG. 1 is a top view of a ballast system according to the present invention.

The present invention is a novel ballast system 10, FIG. 1, for use in a cargo bed 12 of a vehicle, such as a pick-up truck. The ballast system 10 provides generally even weight distribution over the power driven or rear wheels of the vehicle. The ballast system 10 provides additional weight to the cargo bed 12 of the vehicle, thereby improving stability, handling, and rear wheel traction, especially during inclement weather, such as in snow or rain. In the preferred embodiment, the ballast system 10 weighs approximately 130 pounds; however, the weight of the ballast system 10 will depend on the materials and size of materials selected for the ballast system 10 as explained herein. The ballast system 10 also improves the acceleration and braking of the vehicle. The ballast system 10 is easily rolled onto and rolled-up from the cargo bed 12. Moreover, in its rolled up position, the ballast system 10 is conveniently compact and suitable for storage. In the preferred embodiment, the ballast system 10 rolls-up into an eight-inch to ten-inch diameter roll; however, the tightness of the roll will dictate the actual diameter.

In the preferred embodiment, the ballast system 10 includes a plurality of cross-members 16 laminated, attached or bonded between two mats 14. The cross-members 16 are transverse to a longitudinal axis 18 of the cargo bed 12 although this is not a limitation of the present invention as the cross members could instead be disposed parallel to the longitudinal axis 18. In the preferred embodiment, the cross-members 16 are made from steel, 5/16$^{th}$ of an inch thick, two-inches in width, and 30-inches in length; however, the dimensions of the cross-members 16 may be modified to obtain a desired weight of the ballast system 10. In the preferred embodiment, the cross-members 16 do not extend the full width of the mats 14 and are approximately four-inches shorter than the width of the mats 14. Specifically, the cross-members 16 are arranged such that their lengths are two-inches shorter than the mats 14 on both sides of the mats 14. Further, there are, preferably, eighteen cross-members 16 evenly spaced along the mats 14 of the ballast system 10. The evenly spaced cross-members 16 keep the weight of the ballast system 10 balanced in the cargo bed 12. For clarity, some of the cross-members 16 have not been illustrated in the figures. In alternative embodiments, the number of cross-members 16 may be increased or decreased.

The mats 14 are made from flexible rubber, such as anti-tear, non-skid rubber, or from pliable, rubber-like materials. The thickness of the mats 14 will depend upon the desired weight of the ballast system 10; however, in the preferred embodiment, the mats 14 are 1/8$^{th}$ of an inch thick. The length and width of the mats 14 are dictated by the size of the cargo bed 12. For example, the distance between wheel wells 20 of the cargo bed 12 of the vehicle will dictate a width A of the ballast system 10, and the distance between a cab and tailgate of the vehicle will dictate a length B of the ballast system 10. For most vehicles, the mats 14 will have a width A of 38 inches and a length B of 69 inches.

Figure 2:
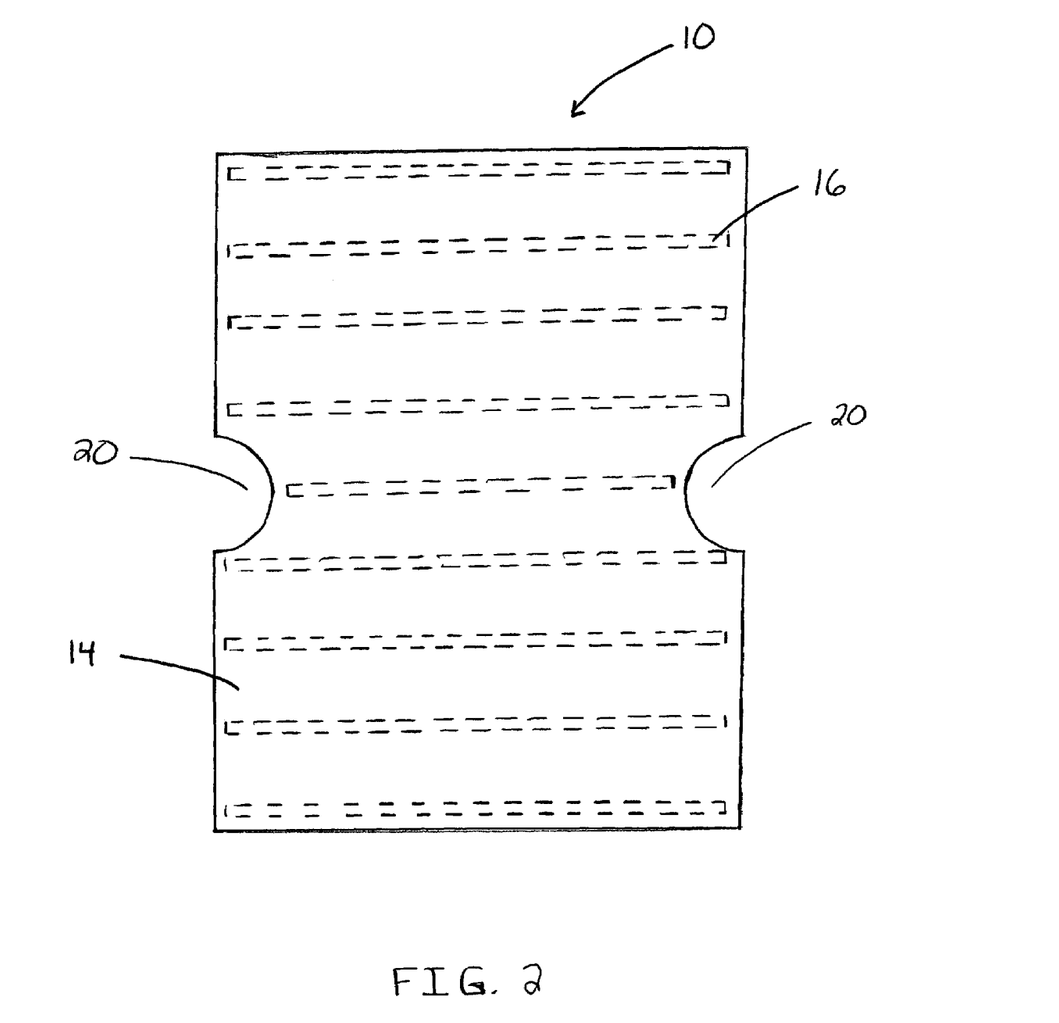
FIG. 2 is a top view of an alternative embodiment of the ballast system according to the present invention.

In an alternative embodiment, the ballast system 10 is "custom" fit to the entire cargo bed 12 less profiles of the wheel wells 20 as shown in FIG. 2. The ballast system 10 fits within inside dimensions of the cargo bed 12 with cutouts for the wheel wells 20. In this alternative embodiment, the cross-members 16 extend almost the entire width of the cargo bed 12; however, as with the preferred embodiment, the cross-members 16 have a length shorter than the mats 14 by four-inches, or two-inches on each side. At least one of the cross-members 16 located between the wheel wells 20 may need to be shortened with respect to the majority of cross-members 16 as shown in FIG. 2. In that case, this cross-member 16 will have a length shorter than the width of the mats 14 in that area by four-inches, or by two-inches on each side.

Figure 3:
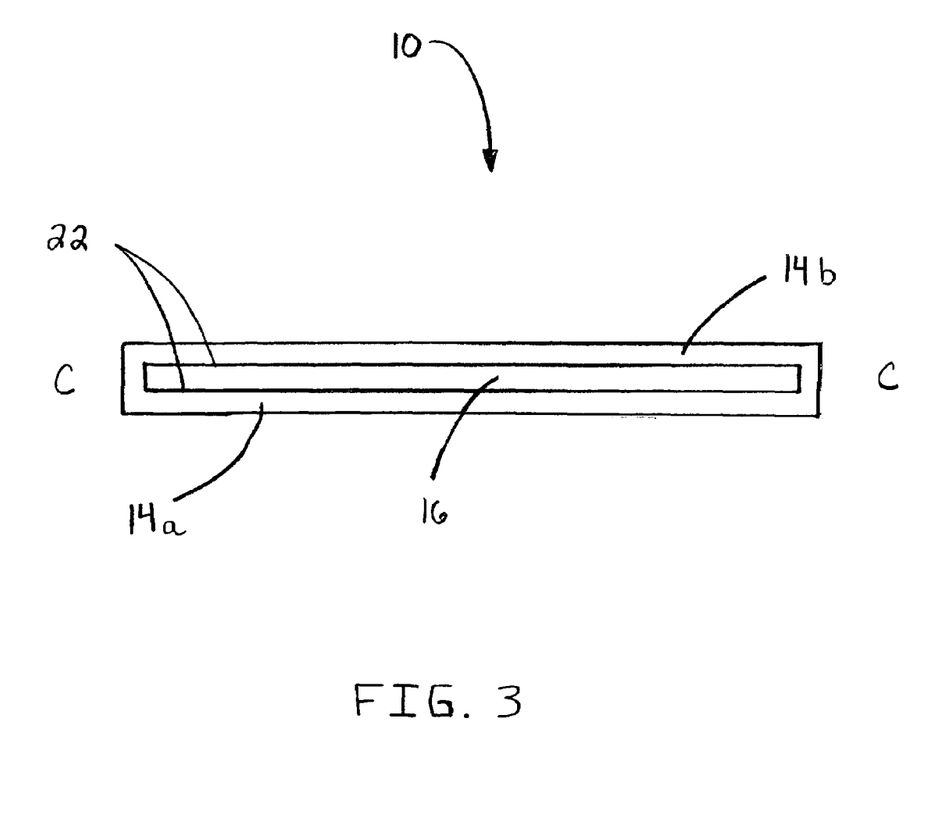
FIG. 3 is a cross-sectional view of the ballast system taken along a longitudinal axis in FIG. 1.

FIG. 3 is a cross-sectional view of the ballast system 10 taken across section 3-3 of FIG. 1. The ballast system includes the plurality of cross-members 16 laminated, attached or bonded between a first mat 14$a$ and a second mat 14$b$. In the preferred embodiment, the cross-members 16 and the first mat 14$a$ and second mat 14$b$ are held together with an adhesive 22. The adhesive 22 is of the type that adheres to the materials selected for the mats 14 and the cross-members 16. For example, if the mats 14 are rubber and the cross-members 16 are steel, the adhesive is of the type that adheres to both rubber and steel. One such adhesive is called Scotch-Grip High Performance Contact Adhesive 1357, which is sold by 3M.

Figure 4:
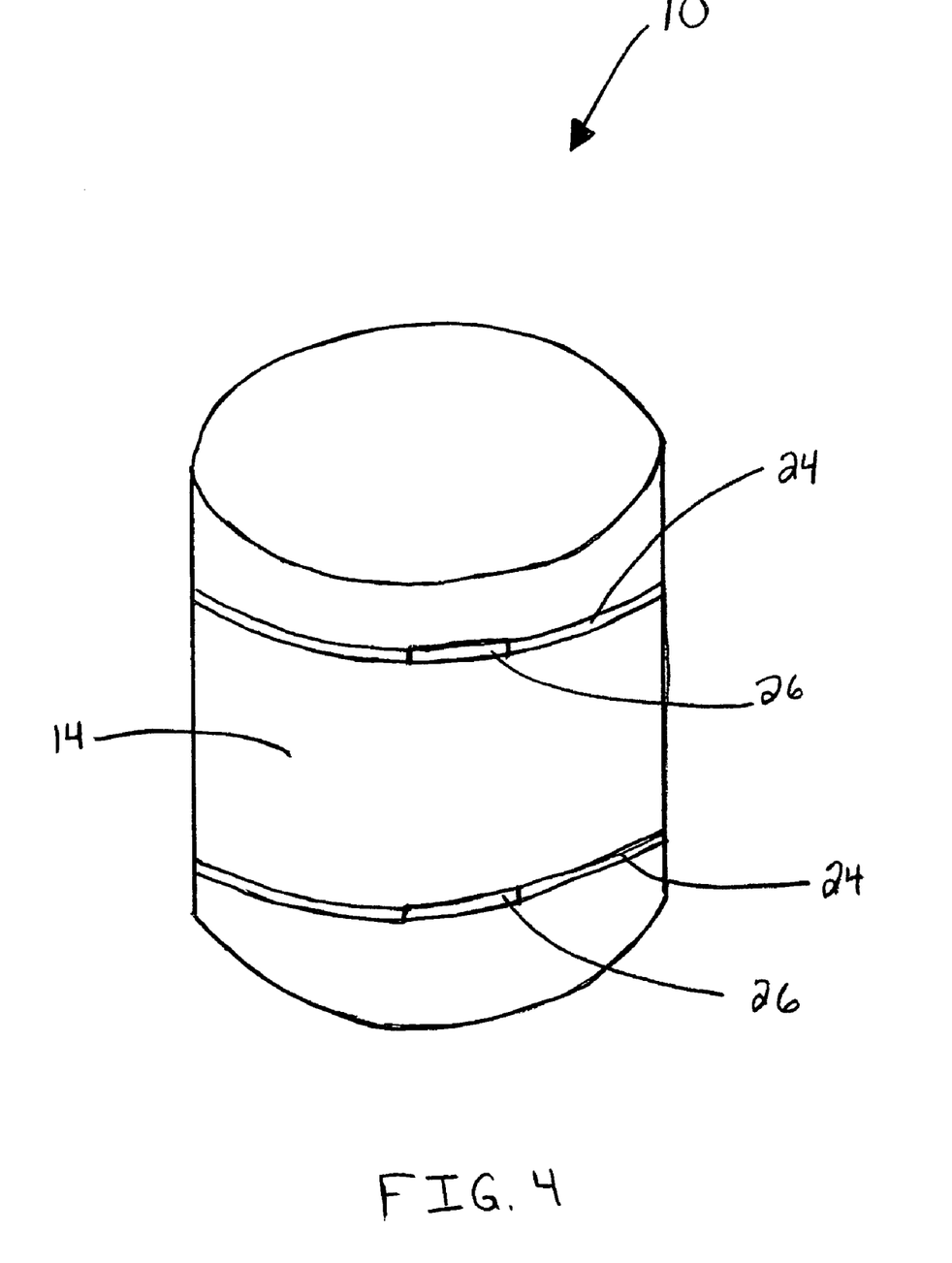
FIG. 4 is a perspective view of the ballast system shown in FIG. 1 in a rolled-up or non-use position.

The ballast system 10 may be readily rolled-up and removed from the cargo bed 12 of the vehicle. The cross-members 16 provide a construction that is easily rolled-up. Hook and loop straps 24 may be placed around each end of the ballast system 10, FIG. 4, for holding the ballast system 10 in the rolled-up position. The hook and loop straps 24 have handles 26 that may be used to move and carry the rolled-up ballast system 10.

Figure 5:
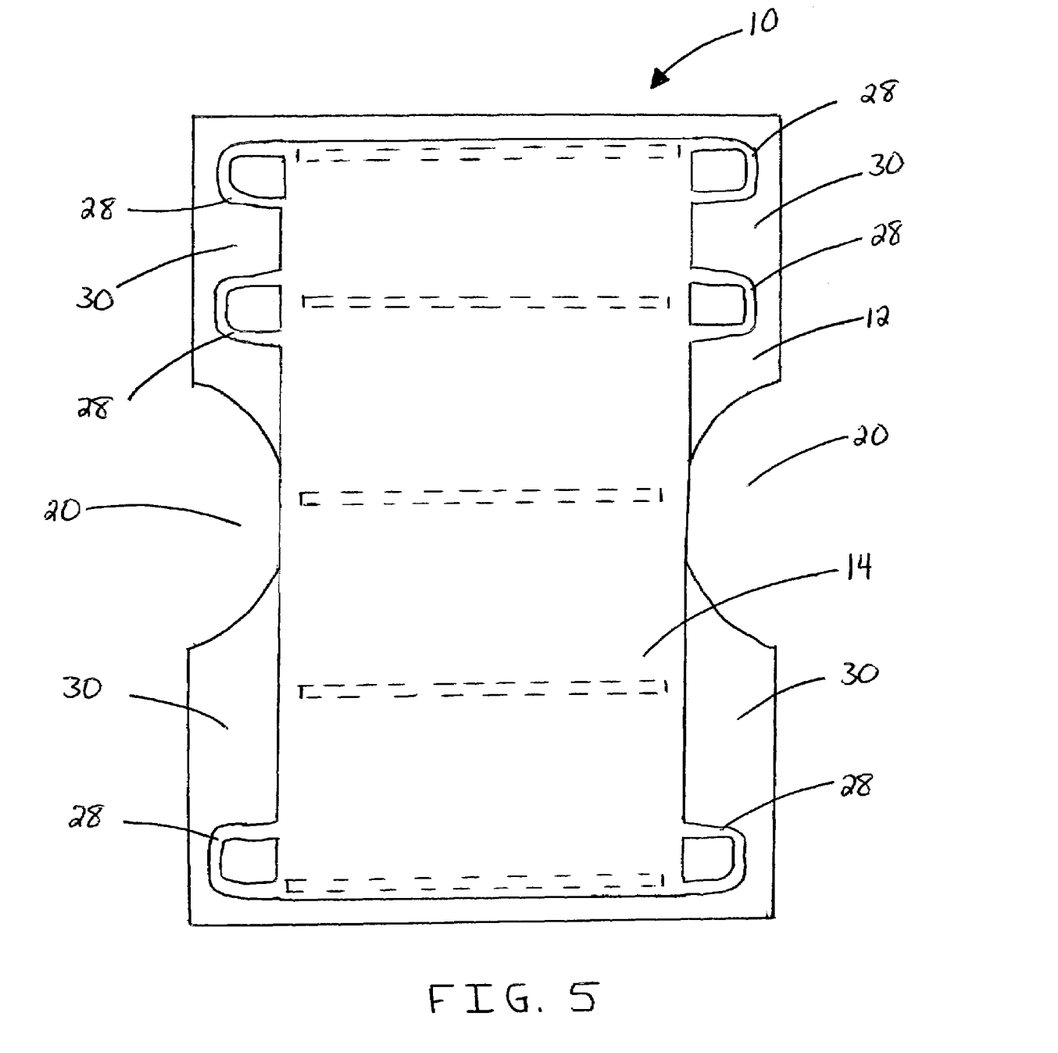
FIG. 5 is a top view of the ballast system having integral handles.
Figure 6:
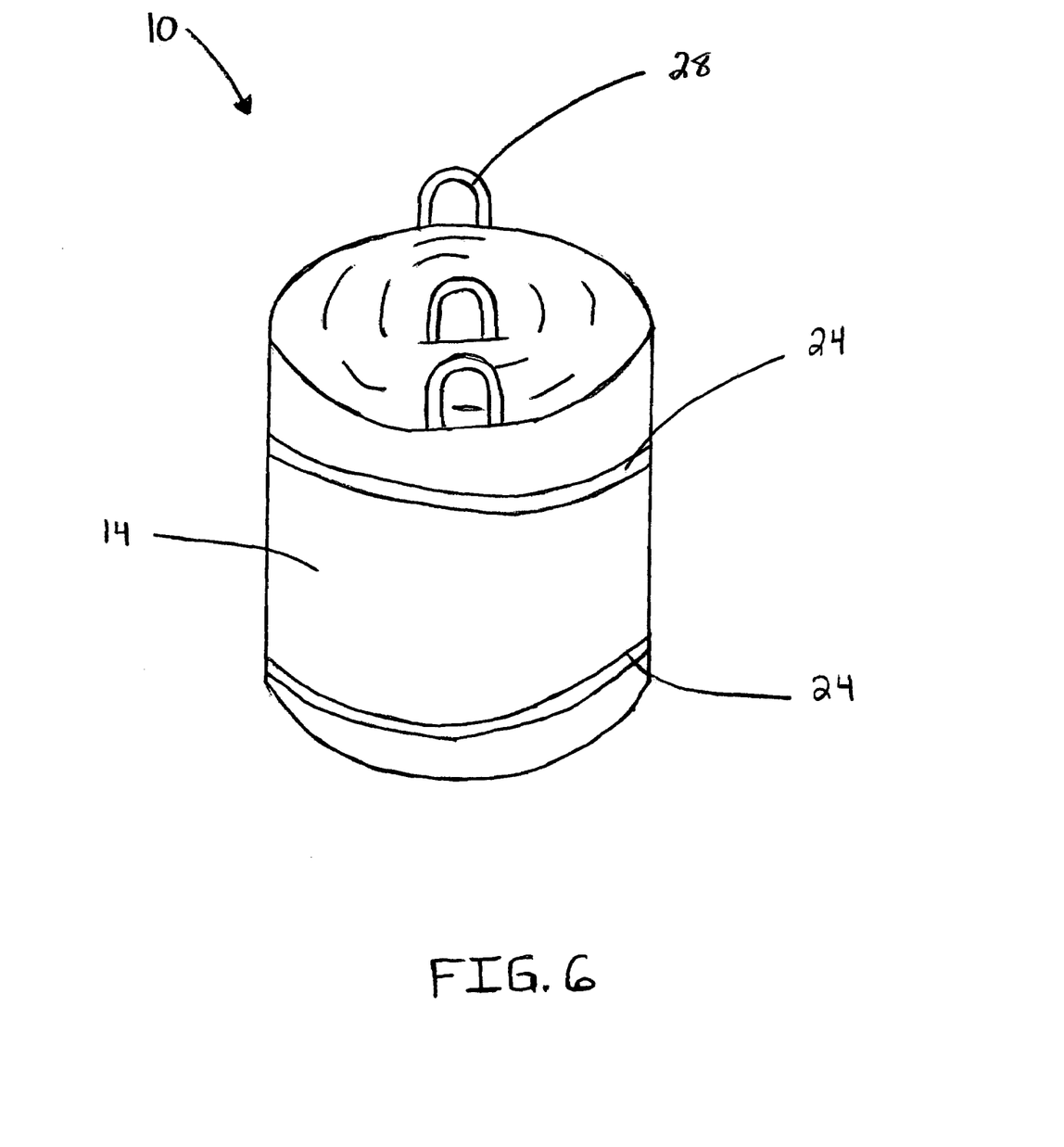
FIG. 6 is a perspective view of the ballast system with the integral handles shown in FIG. 5 in a rolled-up or non-use position.

In an alternative embodiment, the ballast system 10 has integral handles 28 as shown in FIG. 5. The integral handles 28 are used for the embodiment of the ballast system shown in FIG. 1. There are, preferably, six integral handles 28 (i.e., three on each side of the ballast system 10) as shown in FIG. 5. The integral handles 28 rest in areas 30 between the tailgate and wheel wells 20, and the wheel wells 20 and the cab of the vehicle. In this alternative embodiment, the ballast system 10 may be readily rolled-up and removed from the cargo bed 12 of the vehicle. The cross-members 16 provide a construction that is easily rolled-up. The hook and loop straps 24 may be placed around each end of the ballast system 10, FIG. 6, for holding the ballast system 10 in the rolled-up position. However, in this alternative embodiment, the integral handles 28 may be used to move and carry the rolled-up ballast system 10.

Figure 7:
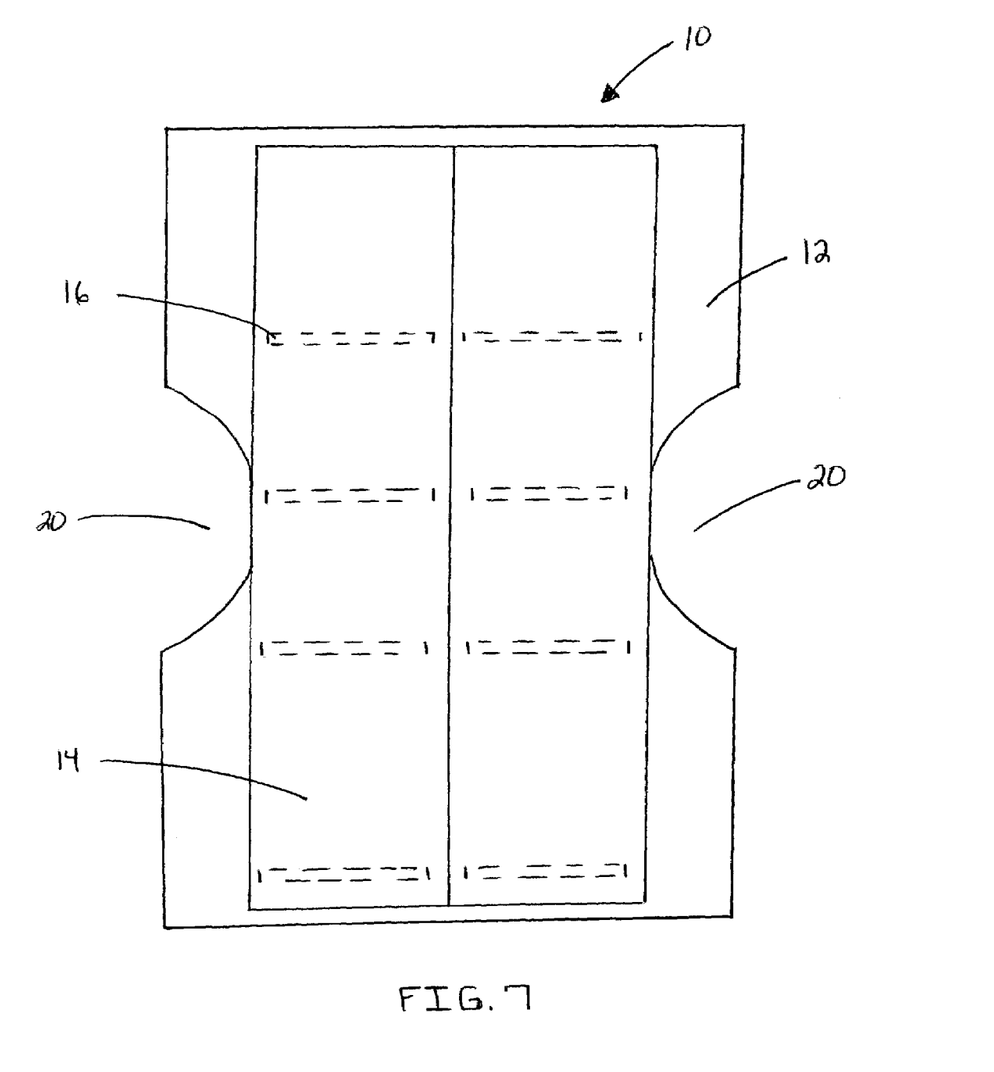
FIG. 7 is a top view of the ballast system having two-parts.

In another alternative embodiment, the ballast system 10 comes in two-parts (i.e., a left side and a right side) as shown in FIG. 7. Thus, the mats 14 have widths of 19 inches and the cross-members 16 have lengths of 15-inches. In this embodiment, the cross-members 16 do not extend the full width of the mats 14 and are approximately four-inches shorter than the width of the mats 14. Specifically, the cross-members 16 are arranged such that they are two-inches shorter than the mats 14 on both sides of the mats 14. In this embodiment, the ballast system 10 has two parts and each part will weigh approximately 65 pounds. This may be preferred to allow the user the ability to carry and move each side of the ballast system 10 and also for shipping purposes. In this embodiment, the integral handles 28 shown in FIG. 5 may be incorporated into the ballast system 10. Further, this embodiment may be modified into the "custom" fit embodiment shown in FIG. 2 but with two-parts, such that each part (i.e., the left and right sides) will have one cutout for the relevant wheel well 20 (i.e., the left wheel well and right wheel well, respectively).

In another embodiment, the ballast system 10 has cross-members 16 that have a length equal to the width of the mats 14. The ends of the ballast system 10 are encapsulated to preclude degradation to the inside of the ballast system 10.

Modifications and substitutions by one of ordinary skill in the art are considered to be within the scope of the present invention, which is not to be limited except by the following claims.

What we claim is:

1. A ballast system for use in a cargo area of a vehicle, comprising:
   at least first and second generally pliable mats;
   a plurality of weighted cross-members configured to provide a ballast for the vehicle, said plurality of cross-members fully enclosed and fixed between said first mat and said second mat; and
   wherein the ballast system can be rolled-up into a roll.

2. The ballast system according to claim 1, wherein the plurality of cross-members are transverse to a longitudinal axis of the cargo area.

3. The ballast system according to claim 2, wherein the plurality of cross-members are bonded between the first mat and the second mat.

4. The ballast system according to claim 3, wherein the first and second mats have widths and the plurality of cross-members have lengths, and wherein the lengths of the plurality of cross-members are approximately four inches shorter than the widths of the first and second mats.

5. The ballast system according to claim 4, wherein the plurality of cross-members are centered on the widths of the first and second mats.

6. The ballast system according to claim 3, wherein the first and second mats have widths, and the plurality of cross-members have lengths, and wherein the lengths of the plurality of cross-members have the same dimensions as the widths of the first and second mats.

7. The ballast system according to claim 6, wherein the ballast system has ends, and the ends are encapsulated.

8. The ballast system according to claim 3, wherein the plurality of cross-members are equally spaced apart from each other in the ballast system.

9. The ballast system according to claim 8, wherein the first and second mats are rubber, and the plurality of cross-members are steel.

10. The ballast system according to claim 9, wherein the rubber is anti-tear, non-skid rubber.

11. The ballast system according to claim 8, wherein the mats are pliable, rubber-like material.

12. The ballast system according to claim 8, further including a strap having a handle that may be placed around each end at the ballast system when the ballast system is rolled-up.

13. The ballast system according to claim 8, further comprising integral handles on the ballast system.

14. The ballast system according to claim 3, wherein the ballast system has a width substantially equal to a distance between wheel wells of a vehicle and a length substantially equal to a distance between a cab and a tailgate of the vehicle.

15. The ballast system according to claim 2, wherein the plurality of cross-members are laminated between the first mat and the second mat.

16. The ballast system according to claim 2, wherein the plurality at cross-members are attached between the first mat and the second mat.

17. A ballast system custom fit to a cargo area of a vehicle, comprising:

a plurality of pliable mats;

a plurality of weighted cross-members configured to provide a ballast for the vehicle, said plurality of cross-members fully enclosed and fixed between a first mat and a second mat of the plurality of pliable mats;

at least one cutout around wheel wells of the ballast system; and wherein the ballast system may be rolled-up into a roll.

18. The ballast system according to claim 17, wherein the plurality of cross-members have lengths and at least one cross-member is shorter than a majority of the plurality of cross-members.

19. A ballast system having two parts for use in a cargo area of a vehicle, comprising:

a plurality of mats;

at least some of a plurality of weighted cross-members configured to provide a ballast for the vehicle, said at least some of said plurality of cross-members fully enclosed and fixed between a first mat and a second mat of the plurality of mats for the first part, and some of the plurality of cross-members fully enclosed and fixed between a first mat and a second mat of the plurality of mats for the second part; and wherein the first and second parts of the ballast system may be individually rolled-up into rolls.

20. The ballast system according to claim 19, wherein the ballast system has a first position when the ballast system is rolled-out onto the cargo area of the vehicle in a use position, and a second position when the ballast system is rolled-up into a roll in a non-use position.

* * * * *